Figure 5:
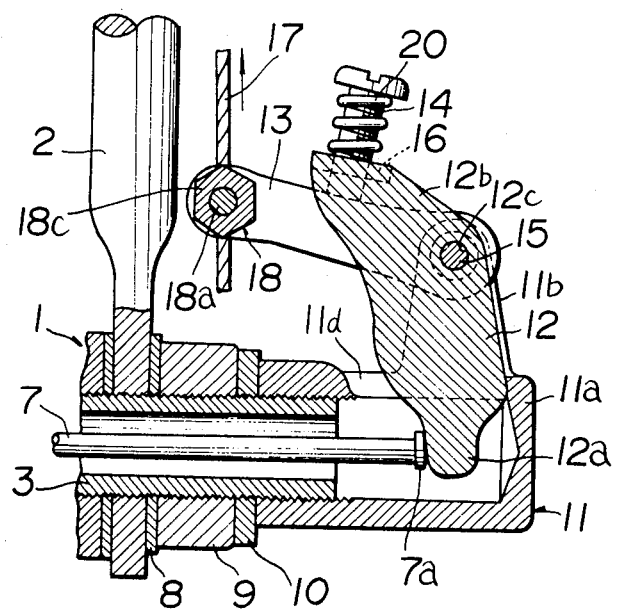

United States Patent [19]

Shimada

[11] B 3,990,715
[45] Nov. 9, 1976

[54] SPEED-CHANGE OPERATING MECHANISM FOR A BICYCLE

[75] Inventor: Shozo Shimada, Sakai, Japan

[73] Assignee: Shimano Industrial Company, Limited, Osaka, Japan

[22] Filed: Apr. 29, 1975

[21] Appl. No.: 572,642

[44] Published under the second Trial Voluntary Protest Program on February 10, 1976 as document No. B 572,642.

[30] Foreign Application Priority Data

May 9, 1974  Japan.............................. 49-52851

[52] U.S. Cl. ............................ 280/236; 74/750 B; 188/2 D
[51] Int. Cl.² ........................................ B62M 25/02
[58] Field of Search ............. 188/2 D, 24; 280/236; 74/526, 750 B; 192/6 A

[56] References Cited
UNITED STATES PATENTS 1,919,531   7/1933   Rosner................................ 188/2 D 3,021,728   2/1962   Shimano.............................. 74/750 B

FOREIGN PATENTS OR APPLICATIONS 983,927   6/1951   France................................. 188/24
985,433   7/1951   France................................. 188/24
359,705   6/1938   Italy..................................... 188/24

Primary Examiner—M. H. Wood, Jr.
Assistant Examiner—Terrance L. Siemens
Attorney, Agent, or Firm—Stevens, Davis, Miller & Mosher

[57] ABSTRACT

A speed-change operating mechanism which actuates a push rod at a speed transmission hub for a bicycle by means of a control wire so as to change the bicycle speed. The mechanism comprises a first operating member for actuating the rod, a second operating member oscillated with the control wire and an adjustor for adjusting the relative position between both the first and second members, through which adjustor the first operating member becomes cooperable with the second operating member, thereby easily and precisely adjusting the travel of the push rod with respect to the control wire.

5 Claims, 6 Drawing Figures

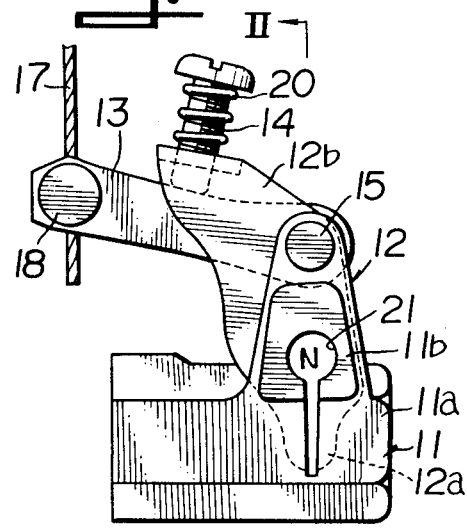
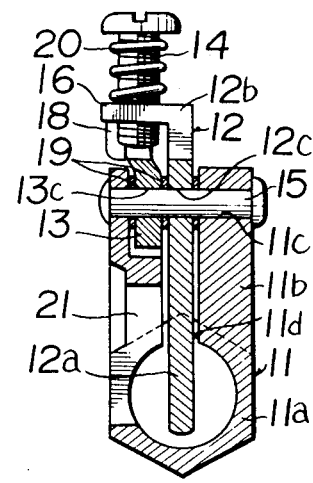
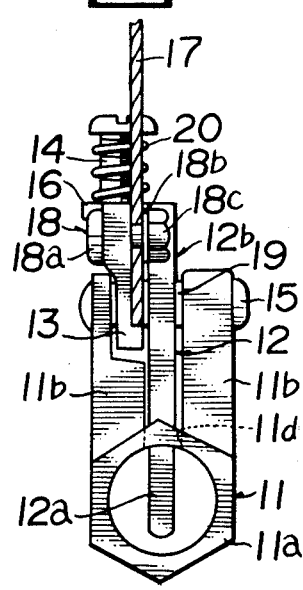
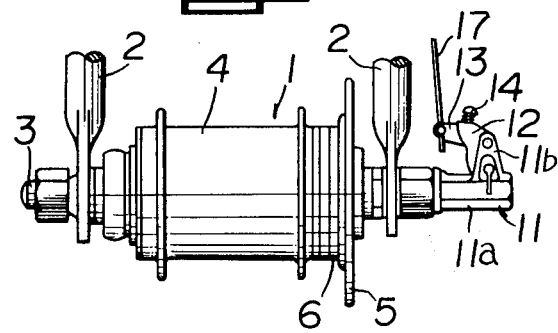

SPEED-CHANGE OPERATING MECHANISM FOR A BICYCLE

This invention relates to a speed-change operating mechanism which is adapted to actuate with a control wire a push rod movably inserted into a hollow hub shaft at a speed transmission hub for a bicycle.

Conventionally, a speed transmission hub for a bicycle has, as is shown in U.S. Pat. No. 3,021,728 of Shimano, a hollow hub shaft at the center thereof and is provided with a gear-shifting means comprising a sun gear mounted to the hub shaft, a gear frame surrounding the shaft and having planetary gears in mesh with the sun gear, and a ring gear having inner teeth in mesh with the planetary gears, so that the drive from a driving means may be conveyed to the hub shell through the gear-shifting means. Also, the hollow hub shaft has a push rod axially movably inserted thereinto, which rod travels to allow a control means to be moved for changing the process of the drive transmission from the driving means to the hub shell into, for example, three speed change stages, such as high, middle and low speed.

The push rod extends at one end thereof out of one end surface of the hub shaft and is outwardly urged by means of a compressed spring, thus the speed change is carried out by inwardly moving the rod against the spring. In this instance, a bell crank is used for actuating the push rod. The bell crank is pivoted to a bracket which is screwed with the threaded end of the hub shaft, so that the crank may be abutted at one end thereof against the end surface of the push rod and be provided at the other end thereof with a control wire fixed thereto. Thus, the control wire is pulled to allow the bell crank to be oscillated and the push rod to be urged, so as to change the bicycle speed.

Now, it is important for the gear-shifting means to keep the push rod to traveling constantly correspondingly to the stroke of an operating lever for the control wire because the fluctuation of travel causes improper gear-shifting at the speed transmission hub.

However, the control or its outer cable is difficult to keep constant in a given length due to extension of the former or contraction of the latter; hence the control wire is apt to be fluctuated in pull length with respect to the stroke of the lever and, thus the push rod being is not properly actuated even with an accurate lever action.

Such a defect has been eliminated in a manner that a fixing means of the control wire to the bell crank is untightened to adjust the relative length of the wire on the outer cable. However, the adjustment has been so troublesome and inexact as to require repeated treatment.

This invention has been designed to solve the problem as aforesaid.

A main object of the invention is the provision of a speed-change operating mechanism which is adjustable easily and exactly even though there is fluctuation of travel of a push rod from the extension of a control wire.

Another object of the invention is the provision of a speed change operating mechanism capable of adjusting in a wide range any fluctuation in length of a control wire or an outer cable thereof.

Still another object of the invention is the provision of a speed-change operating mechanism which can be simply assembled and manufactured at low cost.

The present invention is principally directed to have a conventional bell crank divided in two, namely, the bell crank is formed of two members: a first operating member and a second operating member, between which is provided an adjustor through which the former is operated with oscillation of the latter from pull of the control wire, thereby actuating the push rod for speed change.

Figure 6:
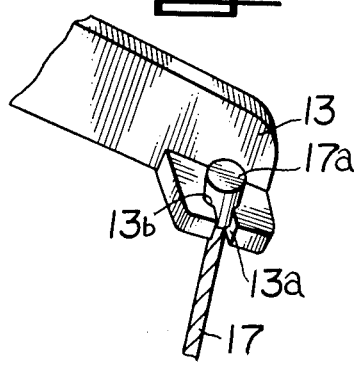

The above and other objects and novel features of the invention will be apparent from the following description in accordance with the accompanying drawings, in which FIG. 1 is a front view showing an embodiment of the invention, FIG. 2 is a sectional view taken on line II—II in FIG. 1, FIG. 3 is a side view of the embodiment in FIG. 1, FIG. 4 is a front view thereof in a state of being attached to a speed transmission hub, FIG. 5 is a longitudinal sectional view of the principal portion of the mechanism in FIG. 4, and FIG. 6 is a perspective view of a modified embodiment which is shown in only a fixing portion to a control wire.

An embodiment of the invention will be described in the following in accordance with FIGS. 1 through 5.

Referring to FIGS. 4 and 5, the reference numeral 1 denotes a speed transmission hub which comprises a hub shaft 3 fixed to a bicycle frame 2, a hub shell 4 rotatably supported to the hub shaft 3, a driving member 6 having a sprocket wheel 5 transmitting the drive from a drive chain to the hub shell 4, and a gear-shifting means (not shown) housed in the hub shell and translating the drive from the driving member 6 to the hub shell 4. The hub shaft 3 has at the hollow center thereof a push rod 7 movably inserted therein. The push rod 7 is adapted to be axially movable so as to change the translation of the drive to the hub shell 4 through the gear-shifting means.

The gear-shifting means as aforesaid is well known, which comprises a sun gear, a gear frame having planetary gears in mesh with the sun gear, a ring gear having inner teeth in mesh with the planetary gears and a control means transmitting the drive from the driving member 6 to the gear frame or the ring gear, so that the control means is actuated to change the drive transmitting process with axial movement of the push rod 7.

Referring to FIG. 5, the reference numeral 8 denotes a washer and 9 denotes a lock nut, with which the hub shaft 3 is rigidly fixed to the bicycle frame 2. The hub shaft 3 is extended outwardly of the lock nut 9 after the nut is screwed to the shaft, and one end of the push rod 7 within the hollow of the hub shaft, is outwardly axially extended further from the extension of the hub shaft 3 and is provided with a swollen portion of a diameter larger than that of the push rod.

The invention is directed to control the abovementioned speed transmission hub with a speed-change operating mechanism comprising a bracket 11; a first operating member 12 and a second operating member 13, which are rotatably pivoted to the bracket; and an adjustor 14 controlling the relative position between both the members 12 and 13.

The bracket 11 is formed of a hollow body 11a which is, as shown in FIGS. 2 and 3, extending in one direction thereof to form two legs 11b, 11b, in parallel and spaced with a given interval therebetween. The legs are provided at the utmost end thereof with bores 11c for receiving a pivot 15 therein respectively. The body 11a is, as shown in FIG. 5, provided between the legs 11b, 11b with a slot 11d large enough to allow the first operating member 12 to travel therein when the member is oscillated within the hollow of the bracket body 11a.

The first operating member 12 and the second operating member 13 are mainly formed of a plate member in a shape respectively as shown in FIGS. 2 and 3. The former has at a substantially middle portion thereof a bore 12c for the pivot 15 and extends at both sides of the bore 12c so that one end reaches the swollen portion 7a so as to be formed in a control portion 12a abutting against the lateral surface of the swollen portion and the other end is formed in an engageable portion 12b outwardly extendable in a given length, the engageable portion 12b having a bent end 16 directed toward the second operating member.

The second operating member 13 is extending substantially in the direction corresponding to the extension 12b of the first operating member 12.

A bore 13c is formed at the base of the second operating member 13 and a retainer 18 for the control wire 17 is attached to the foremost end of the same.

The retainer 18 is, as shown in FIG. 3, composed of a headed bolt 18a with a bore at a substantially middle portion thereof, through which bore is passed the control wire 17 to be tightened with a nut 18c through a washer 18b so that the wire may be retained to the second operating member 13. In addition, for fixing the wire to the second operating member, a peripherally tapered swollen portion 17a is, as shown in FIG. 6, attached to a terminal of the control wire and at a bent end of the second operating member 13 is formed a bore 13b which has a partially lateral opening 13a for inserting the wire into the bore 13b therethrough, so that the swollen portion 17a may be insertibly fixed to the bent end through the bore 13b.

The abovementioned first and second operating members 12 and 13, are pivoted to the legs 11b, 11b with a pivot 15 through a liner 19 after each of bores 12c and 13c of both the operating members is allowed to coincide with the bores 11c at the legs 11b respectively, so that both the operating members may independently be oscillated through the pivot 15.

The adjuster 14 which is mounted to the bent end 16 at the first operating member 12 so as to control the mutually relative position of both the operating members 12 and 13, is formed of an adjust screw or bolt screwed to a threaded bore at the bent end 16 so that the bolt may be abutted at the tip thereof against the upper edge of the second operating member 13. Additionally, the adjustor 14 may be mounted to the second operating member 13 in place of the first operating member 12. A cam being available instead of the bolt is preferable from its simple construction. When the bolt is used for the adjustor, it is preferable to use a spring 20 for keeping the adjustor on its adjusted position.

Next, the speed change operating mechanism of the invention is mounted to the speed transmission hub 1 in a manner that the bracket 11 is, as shown in FIG. 5, screwably mounted to the extension of the hub shaft 3 after a washer 10 is inserted thereto. When the control wire 17 is pulled with an operating lever (not shown) in the direction of the arrow, the second operating member 13 is fulcrumed at the pivot 15 to be oscillated.

As the result, the first operating member 12 which is cooperatively connected with the second operating member 13 through the adjustor 14 in contact therewith, oscillates around the pivot 15, whereby the control portion 12a urges the push rod 7 to be axially moved for exerting the gear-shifting means at the speed transmission hub 1.

In this instance, when the pull of operating wire 17 inexactly corresponds to a given stroke of the operating lever due to, for example, extension in length of the control wire, the push rod 7 becomes inaccurate in motion with respect to the speed change stage, resulting in improper speed-change operation. The abovementioned adjustor 14 can, however, correct or adjust the travel of the push rod 7 in a manner that when the wire 17 lengthens the adjustor is forwardly screwed so that the second operating member 13 may be more distant relatively from the engageable portion 12b, thereby offsetting the extension of the control wire 17.

In this instance, a through hole 21 formed at one of legs 11b and a letter N marked at one surface of the first operating member 12 opposite to the hole so as to indicate the neutral position of the member, are available for an exact correction by seeing the letter through the hole. Namely, when the operating lever is set at a middle speed stage, the letter N appearing at the center of the through hole 21, indicates that the first operating member 12 is exactly positioned corresponding the middle speed stage. When the letter N is off center of the hole 21 this indicates the extension of the control wire 17. At this time, the adjustor 14 is forwardly screwed to cause the first operating member 12, not the second operating member 13, to be moved till the letter N comes to appear at the center of the hole 21 so that the push rod 7 may be adjusted to exactly exert the gear-shifting means corresponding to the middle speed stage.

As in clearly understood from the aforesaid description, the speed-change operating mechanism of the invention is so constructed that the operating member, being one member, such as a bell crank, in a conventional one, is divided into two members, i.e., the first and the second operating members, the former being brought into contact with the push rod and the latter being provided with the control wire, and the adjustor is mounted between both the operating members so that the first operating member may be moved with the second operating member through the adjustor, thereby controlling the relative position between both the members by means of the adjustor. Accordingly, the extension in length of the control wire may, even when it occurs, be corrected easily and rapidly and, furthermore, precisely by use of the mark and the index thereof showing the speed change stage.

While an embodiment of the invention has been shown and described, the invention is not limited to the specific construction thereof, which is merely exemplified in the specification.

What is claimed is:

1. A speed-change operating mechanism for a bicycle, which is adapted to be operated with a control wire so as to actuate a push rod which is freely axially movably inserted into a hollow hub shaft at a speed transmission hub, comprising a. a bracket fixed to said hub shaft,
b. a first operating member pivoted to said bracket and capable of oscillation in relation to said bracket, said first operating member having an axial bore at the middle portion thereof and extending substantially at both sides of said bore to form a control portion and an engageable portion respectively, said control portion being at one end of said first operating member to reach and come in contact with the foremost end of an extension of said push rod, said engageable portion being at the other end of said first operating member and outwardly extending in a given length, c. a second operating member pivoted to said bracket and capable of oscillation in relation to said bracket, said second operating member having an axial bore at a base thereof and extending in the direction corresponding to said engageable portion at the first operating member so as to form a fore end provided with a retainer for fixing one terminal of said control wire therewith, and d. an adjustor provided between the engageable portion of said first operating member and the middle portion of said second operating member, said adjustor being mounted to one of said operating members for engagement with the other of said operating members, whereby when said control wire is operated the oscillation of said second operating member is conveyed to said first operating member.

2. The speed-change operating mechanism as claimed in claim 1, wherein said adjustor is mounted at the engageable portion at the foremost end of said first operating member and the tip of said adjustor is permitted to abut against the middle portion of said second operating member.

3. The speed-change operating mechanism as claimed in claim 1, wherein said adjustor is mounted at the middle portion of said second operating member and the tip of said adjustor is permitted to engage said first operating member.

4. The speed-change operating mechanism of claim 1, wherein said adjustor is formed of a headed screw.

5. The speed-change operating mechanism as claimed in claim 1, wherein said first operating member is formed of a plate member at one side of which a mark is put to indicate a proper position of said first operating member and said bracket is provided with an index for said mark.

* * * * *